J. S. Upton,
Horse Power,
Nº 23,280.
Patented Mar. 15, 1859.
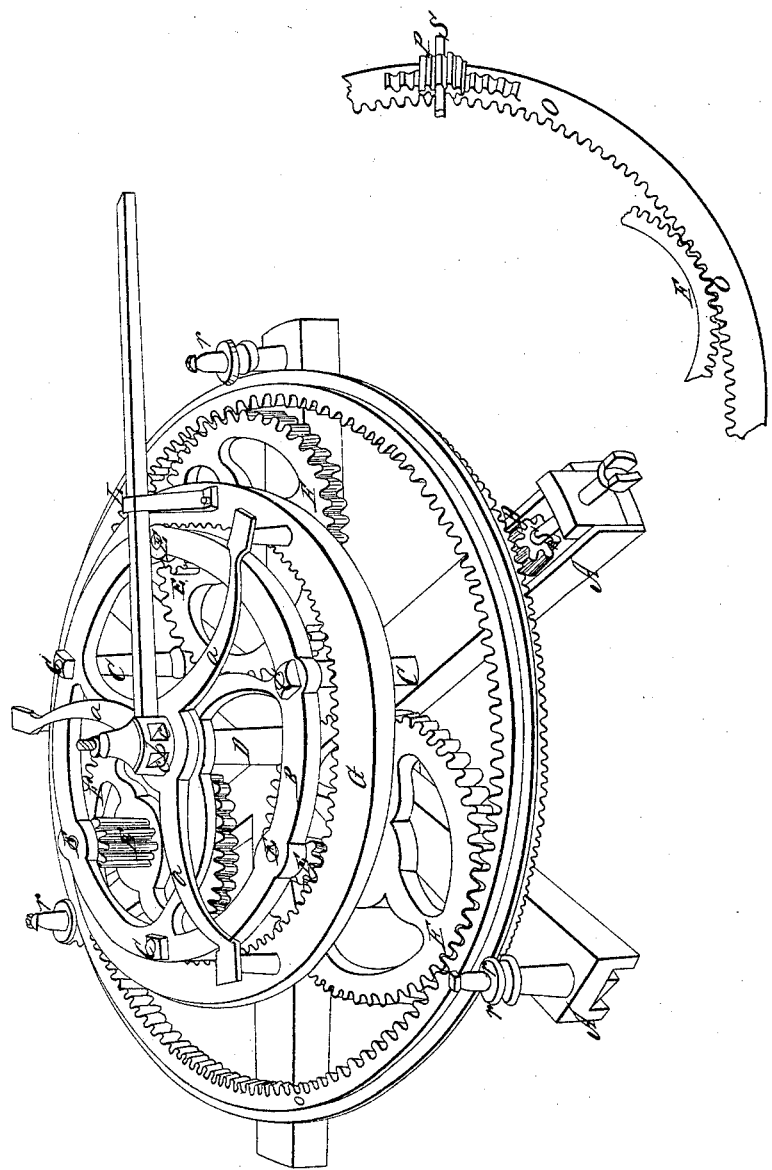

UNITED STATES PATENT OFFICE.

JAMES S. UPTON, OF BATTLE CREEK, MICHIGAN.

HORSE-POWER.

Specification of Letters Patent No. 23,280, dated March 15, 1859.

*To all whom it may concern:*

Be it known that I, JAMES S. UPTON, of Battle Creek, in the county of Calhoun and State of Michigan, have invented a new and useful Improvement on Horse-Powers; and I do hereby declare that the following is a full, clear, and exact description of the construction and operation of the same, reference being had to the annexed drawings, making a part of this specification, in which—

Figure 1 is a perspective view, and Fig. 2 is a transverse section.

The same letters refer to like parts in both drawings.

This horse power may be constructed entirely of cast iron, with the exception of the holding down bolts, and the levers, and their appurtenances.

A, is the bed plate.

B, is a strong circular rim with arms firmly secured to the bed plate at a proper distance apart by bolts passing through three hollow studs C, C, C, and central standard pin D. Three short vertical shafts, carrying the pinions, E, E, E, and spur wheels F, F, F, are arranged equidistant, in the circle formed by the rim, B, and revolve in bearings cast into or inserted in said rim B, and bed plate A.

G, is an internal toothed spur wheel gearing into the pinions, E, E, E, its arms $a, a, a$, are arched sufficiently to span the rim B, and its center boss, $b$, has sockets, $c, c, c, c$, cast around it to receive the ends of the levers. One of which with its socket stand is shown at L. The outer lever stands are bolted to the rim of the wheel, G, its edge being flanched for their attachment, as also to strengthen the said rim.

O, is a large annular wheel with internal spur gear working in the spur wheels F, F, F, it is also toothed on its lower face to match the small, beveled pinion, P, on the coupling shaft S. This annular wheel O is kept in position by a thin flanch on its periphery working in the grooved rollers, $r, r, r$, or, in any other convenient way.

The wheel, G, being revolved by the levers gives motion (through the intervention of the three pinions, E, E, E, on the vertical shafts) to the three spur wheels F, F, F, on the same shafts. These spur wheels gearing internally with the annular wheel O, cause that wheel to revolve and one of its faces being toothed to match the beveled pinion, P, revolves the horizontal coupling shaft S, with a motion vastly accelerated.

I do not claim as my invention any mere arrangement of external with internal gear to produce accelerated motion by wheels toothed merely on one side or face, as such combinations are seen every day in endless variety; but What I do claim as my invention and desire to secure by Letters Patent, is—

The arrangement of the driving wheel, G, with the pinions, E, E, E, and wheels, F, F, F, in combination with the annular wheel, O, with toothed gear on its internal edge and on one of its faces, for the purpose and in the manner substantially as herein described and set forth.

J. S. UPTON.

Signed and witnessed in presence of—
I. BURTON, Jr.,
GEORGE WILLARD.